(12) United States Patent
Nakano

(10) Patent No.: US 6,934,406 B1
(45) Date of Patent: Aug. 23, 2005

(54) IMAGE PROCESSING APPARATUS, IMAGE PROCESSING METHOD, AND RECORDING MEDIUM RECORDED WITH IMAGE PROCESSING PROGRAM TO PROCESS IMAGE TAKING INTO CONSIDERATION DIFFERENCE IN IMAGE PICKUP CONDITION USING AAM

(75) Inventor: Yuusuke Nakano, Akashi (JP)

(73) Assignee: Minolta Co., Ltd., Osaka (JP)

( * ) Notice: Subject to any disclaimer, the term of this patent is extended or adjusted under 35 U.S.C. 154(b) by 750 days.

(21) Appl. No.: 09/589,109

(22) Filed: Jun. 8, 2000

(30) Foreign Application Priority Data

Jun. 15, 1999 (JP) ................................. 11-168690

(51) Int. Cl.$^7$ .............................................. G06K 9/00
(52) U.S. Cl. ..................................... 382/118; 382/154
(58) Field of Search . 382/116–120, 154; 345/416–633

(56) References Cited

U.S. PATENT DOCUMENTS

| | | | | |
|---|---|---|---|---|
| 5,375,195 A | * | 12/1994 | Johnston ...................... | 395/630 |
| 5,818,457 A | * | 10/1998 | Murata et al. ............... | 345/435 |
| 5,867,171 A | * | 2/1999 | Murata et al. ............... | 345/435 |
| 5,933,527 A | * | 8/1999 | Ishikawa ..................... | 382/118 |
| 5,969,721 A | * | 10/1999 | Chen et al. .................. | 345/419 |
| 5,995,119 A | * | 11/1999 | Cosatto et al. ............... | 345/473 |
| 6,556,196 B1 | * | 4/2003 | Blanz et al. ................. | 345/419 |

FOREIGN PATENT DOCUMENTS

| | | |
|---|---|---|
| JP | 63-177273 | 8/1988 |
| JP | 6-168317 | 6/1994 |

OTHER PUBLICATIONS

Georghiades et al. "From few to many: generative models for recognition under variable pose and illlunination" Proc. Fourth IEEE International Conf. on Automatic Face and Gesture Recognition, 2000, pp 277-284, Mar. 2000.*

Edwards et al., "Face recognition using statistical models" IEEE Colloquium on Image Processing for Security Application, 1997, pp. 2/1-2/6, Mar. 1997.*

Georghiades et al "Illumination cones for recognition under variable lighting: faces" Proc. 1998 IEEE Computer Scociety Conference on Computer Vision and Pattern Recognition, pp. 52-58, Jun. 1998.*

Edwards et al. "Learning to indentify and track faces in image sequences" Computer Vision, 1998, sixth International Conferenc on, pp. 317-322, Jan. 1998.*

International Conference on Automatic Face and Gesture Recognition—Apr. 14-16, 1998 Nara, Japan.

* cited by examiner

Primary Examiner—Jingge Wu
(74) Attorney, Agent, or Firm—McDermott Will & Emery LLP

(57) ABSTRACT

In order to eliminate influence due to difference in the image pickup condition from an input image, an image processing apparatus includes a landmark point data input unit to input coordinates of a landmark point of a face image input through an image input unit and the grey-level value of texture of a face image, an inclination amount input unit to input an inclination amount of a face image in the depth direction, and an image space formation unit forming an image space by carrying out principal component analysis on a plurality of landmark point data and a plurality of inclination amounts with respect to a plurality of the input face images.

6 Claims, 11 Drawing Sheets

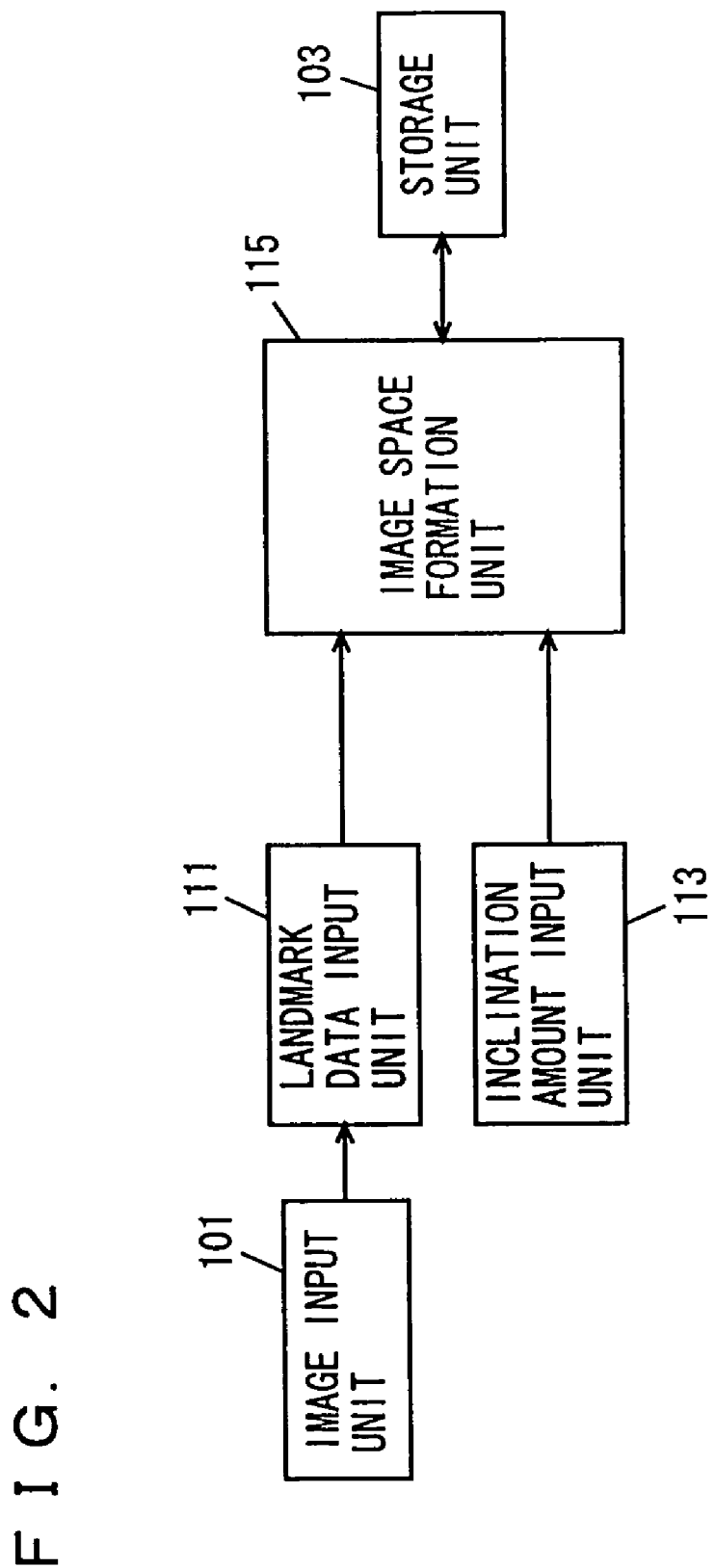
F I G. 2

F I G. 3
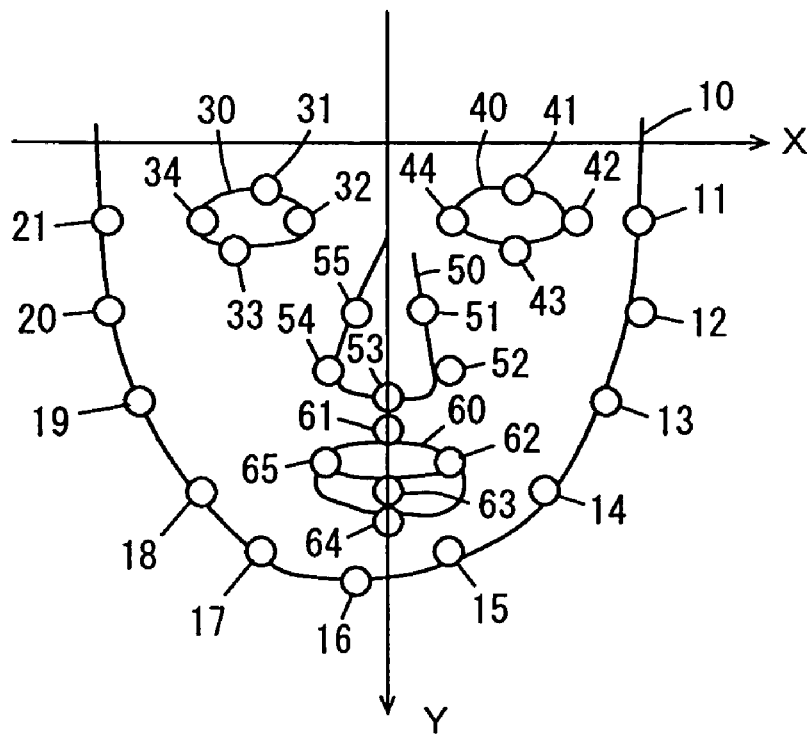
F I G. 4
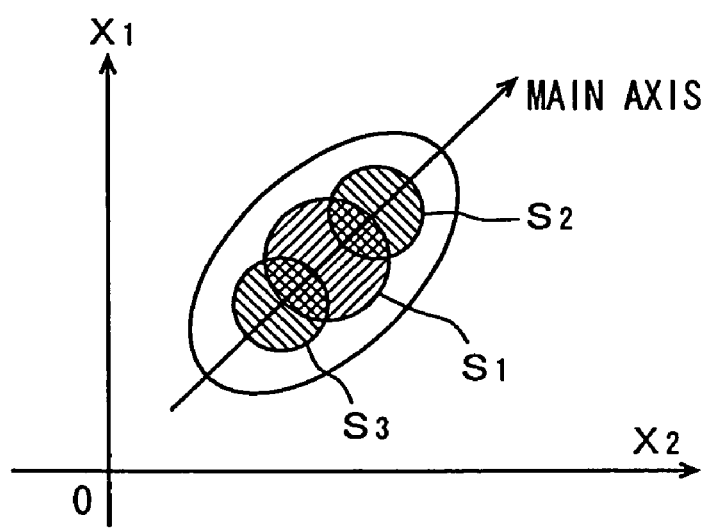

IMAGE PROCESSING APPARATUS, IMAGE PROCESSING METHOD, AND RECORDING MEDIUM RECORDED WITH IMAGE PROCESSING PROGRAM TO PROCESS IMAGE TAKING INTO CONSIDERATION DIFFERENCE IN IMAGE PICKUP CONDITION USING AAM

This application is based on Japanese Patent Application No. 11-168690 filed in Japan, the contents of which are hereby incorporated by reference.

BACKGROUND OF THE INVENTION

1. Field of the Invention

The present invention relates to an image processing apparatus, an image processing method, and a recording medium recorded with an image processing program. More particularly, the present invention relates to an image processing apparatus, an image processing method, and a recording medium recorded with an image processing program to process an image taking into consideration difference in the pickup condition of a face image using an AAM (Active Appearance Model).

2. Description of the Related Art

As a method of synthesizing a natural face image by analyzing statistically many face images without using a three-dimensional shape, Cootes et al. of University of Manchester have proposed a method using an AAM. The method using an AAM includes the steps of extracting shape information and texture information from the position, grey-level value and the like of landmark points defined for each feature of the face from a large number of two-dimensional face images, applying principal component analysis on each of the plurality of extracted shape information and texture information, and obtaining an orthonormal coordinate system (image space) corresponding to change in the shape and face expression, and altering the parameters along respective coordinate axes of the obtained image space to synthesize a face image. When an AAM is employed in an image recognition method, the parameters are altered within an obtained image space to synthesize an image. The parameters of the synthesized image that has the smallest difference from the face image that is the subject of recognition are obtained. By measuring the distance from the landmark vector of a face image that is already registered with the obtained parameters, recognition is made whether the image matches or not.

Japanese Patent Laying-Open No. 6-168317 discloses an individual identification apparatus taking into account inclination of the face. According to this individual identification apparatus, the position information of the landmark point of a face image is obtained to calculate the leftwards and rightwards rotation angle on the basis of the obtained position information and depth information of a reference face model. The position information of the landmark point is corrected so that the rotation angle becomes zero according to the obtained rotation angle and depth information. The individual identification process is carried out using the corrected landmark points. This individual identification apparatus can prevent reduction in the recognition rate of an input face image even if there is rotational difference leftwards or rightwards (the direction of turning the neck horizontally) between the face image that is registered in advance and the input face image.

The foregoing AAM employs a two-dimensional image. It is to be noted that shape information corresponds to the two-dimensional coordinates of a landmark point defined for each feature of a face. There was a problem that, from the extracted shape information, difference in the inclination of the face image in the depth direction could not be made such as whether the two-dimensional face image corresponds to a face oriented frontwards, upwards, or downwards. For example, the two-dimensional face image of a person with a wide forehead will be represented with a small forehead when the face is inclined upwards. If distinction of the face image in the depth direction cannot be made, the shape information extracted from the two-dimensional face image will erroneously represent the shape of a person with a small forehead.

The art disclosed in the foregoing Japanese Patent Laying-Open No. 6-168317 can accommodate difference in the rotation angle of the face in the horizontal direction in image recognition. However, there was a problem that upward or downward rotation, i.e. inclination in the depth direction, could not be accommodated.

As to an image obtained by shooting in a dark place and an image obtained by shooting in a light place, the object, even though identical, will be represented in different colors in the image. To remove this difference in the illumination condition, normalization of the light intensity was effected conventionally. In that case, there was a problem that difference in the color of the skin could not be identified. In other words, there was a problem that the tendency of the characteristic feature of a face arising from difference in nationality could not be extracted.

SUMMARY OF THE INVENTION

In view of the foregoing, an object of the present invention is to provide an image processing apparatus, an image process method, and a recording medium recorded with an image processing program that can eliminate influence of difference in the image pickup condition from the input image.

Another object of the present invention is to provide an image processing apparatus, an image processing method, and a recording medium recorded with an image processing program that can synthesize an image of an object, eliminated with influence of difference in the image pickup condition from the input image.

A further object of the present invention is to provide an image processing apparatus, an image processing method, and a recording medium recorded with an image processing program that allows recognition of an object differing by different image pickup conditions as the same object.

According to an aspect of the present invention, an image processing apparatus includes a landmark amount input unit to input a landmark amount of an object included in the input image, an image pickup condition input unit to input the image pickup condition of shooting the input image, and an image space formation unit to form an image space by applying a statistical method on the plurality of landmark amounts input through the landmark amount input unit and a plurality of image pickup conditions input through the image pickup condition input unit with respect to a plurality of object images.

According to the present invention, an image processing apparatus that can eliminate influence of difference in the image pickup condition from the input image can be provided.

According to another aspect of the present invention, an image processing apparatus includes a storage unit to store an image space generated according to the landmark amount of an object included in the image and the image pickup condition of shooting the image, a parameter input unit to input a parameter of the image space, and an image synthesis unit synthesizing an image according to the parameter input through the parameter input unit.

According to the present invention, an image processing apparatus that can synthesize an image of an object eliminated with influence of difference in the image pickup condition from the input image can be provided.

According to a further aspect of the present invention, an image processing apparatus includes a first storage unit to store an image space generated according to a landmark amount of an object included in an image and an image pickup condition of shooting the image, a parameter optimization unit automatically extracting a first parameter whose difference between a first object included in the input image and an image synthesized by moving the parameter in the image space is smallest, a second storage unit storing a plurality of second objects respectively in correspondence with a second parameter in an image space, and a selection unit comparing the first parameter with the second parameter to select a desired object from the plurality of second objects.

According to the present invention, an image processing apparatus can be provided that allows recognition of an object differing due to different image pickup conditions as the same object.

According to still another aspect of the present invention, an image processing method includes the steps of entering a landmark amount of an object image included in an input image, entering an image pickup condition of shooting the input image, and forming an image space by applying a statistical method on a plurality of landmark amounts input at the step of entering a landmark amount and a plurality of image pickup conditions input at the step of entering an image pickup condition with respect to a plurality of object images.

According to the present invention, an image processing method can be provided that allows influence of difference in the image pickup condition removed from the input image.

According to a still further aspect of the present invention, a recording medium is recorded with an image processing program for a computer to execute the steps of entering a landmark amount of an object included in an input image, entering an image pickup condition of shooting the input image, and forming an image space by applying a statistical method on a plurality of landmark amounts input at the step of entering a landmark amount and a plurality of image pickup conditions input at the step of entering an image pickup condition with respect to a plurality of object images.

According to the present invention, a recording medium can be provided recorded with a image processing program for a computer to execute an image process that can eliminate influence of difference in the image pickup condition from an input image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram schematically representing the image space formation function of an image processing apparatus according to the first embodiment.

FIG. 3 is a schematic diagram showing a face image and landmark points.

FIG. 4 represents distribution of a face image oriented frontwards, upwards and downwards in the $X_1$–$X_2$ coordinates of respective landmark points.

DESCRIPTION OF THE PREFERRED EMBODIMENTS

Figure 1:
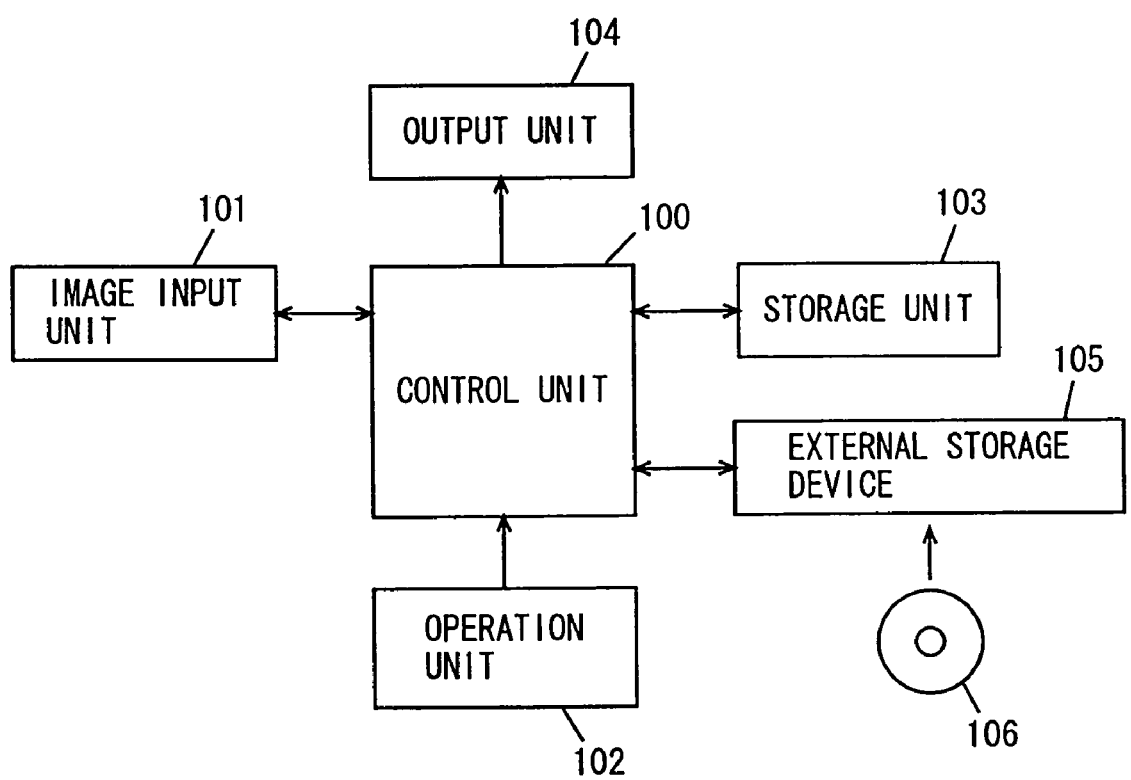
FIG. 1 is a block diagram showing the hardware structure of an image processing apparatus according to a first embodiment of the present invention.

Embodiments of the present invention will be described hereinafter with reference to the drawings. In the drawings, likewise or corresponding components have the same reference characters allotted.

First Embodiment

Referring to FIG. 1, an image processing apparatus according to a first embodiment of the present invention includes a control unit 100, an image input unit 101 to input an image of a person's face, an operation unit 102 for the user of the apparatus to enter data and various instructions, a storage unit 103 recorded with a program to be executed by control unit 100, and to store information required for control unit 100 to execute a program, an output unit 104 to output an image, and an external storage device 105.

Control unit 100 is a central processing unit (CPU) to provide overall control of the image processing apparatus. Image input unit 101 is an image scanner including a linear CCD sensor to read in a photographic picture or the like with a face to provide two-dimensional face image data. It is to be noted that a digital camera or the like can be used to actually shoot an individual to provide a two-dimensional face image. Also, image input unit 101 may be an input terminal for connection with an external image scanner or digital camera.

Storage unit 103 includes a ROM to store a program to be executed by control unit 100, a RAM to temporarily store variables or the like required to execute a program with control unit 100, a hard disk to store various data, and the like.

Output unit 104 is a display to display the image input through image input unit 101 or an image subjected to image processing. A printer can be used together with the display.

External storage device 105 is a magneto-optical disk drive or a digital video disk drive to read in a program recorded in a recording medium 106 to be executed with control unit 100 or two-dimensional face image data. A synthesized face image subjected to the image synthesis process with control unit 100 and the image recognition result can be written into recording medium 106.

FIG. 2 is a function block diagram schematically showing the image space formation function of the image processing apparatus of the first embodiment. The image processing apparatus includes a landmark data input unit 111 to input data of a landmark point of a two-dimensional face image input through image input unit 101, an inclination amount input unit 113 to input the amount of inclination of the two-dimensional face image in the depth direction, and an image space formation unit 115 applying principal component analysis according to the landmark data and inclination amount input through landmark data input unit 111 and inclination amount input unit 113 to generate an image space represented by a basic vector. The basic vector of the image space generated by image space formation unit 115 is stored in storage unit 103. The face image input through image input unit 101 and used in generation of the image space is stored in storage unit 103 together with the parameter in the image space.

Landmark data input unit 111 receives as landmark data the coordinates of a landmark point to identify the contour of the face, the eye, nose or mouth of the face image input through image input unit 101 and the grey-level value of the texture of the face image. The two-dimensional face image input through image input unit 101 is shown on the display of output unit 104. The operator views the face image provided on the display of output unit 104 and clicks a predetermined position using the mouse of operation unit 102. The position clicked with the mouse becomes a landmark point. The coordinates and the grey-level value of the texture of the face image corresponding to that landmark point are input as landmark data.

The landmark point will be described in further detail hereinafter. FIG. 3 schematically shows a face image and the landmark points. Referring to FIG. 3, a face contour 10, eye contours 30 and 40, a nose contour 50 and a mouth contour 60 are indicated. A landmark point is defined with respective contours 10, 30, 40, 50 and 60 as a reference. Eleven landmark points 11–21 are identified on the basis of face contour 10. Four landmark points 31–34 are identified on the basis of light eye contour 30. Four landmark points 41–44 are identified on the basis of left eye contour 40. Five landmark points 51–55 are identified on the basis of nose contour 50. Five landmark points 61–65 are identified on the basis of mouth contour 60.

Only twenty nine landmark points are shown in FIG. 3 for the sake of simplification. It is desirable that landmark points sufficient to give the feature of a shape are provided. Preferably, approximately 122 landmark points should be provided.

As to the inclination amount input unit of FIG. 2, the amount of inclination of the face image in the depth information input through image input unit 101 is entered. The operator views the face image on the display of output unit 104 to determine whether the face is oriented frontwards, upwards or downwards to enter the inclination amount in the depth direction through the keyboard of operation unit 102. For example, the inclination amount is set to a when facing upwards, to 0 when facing frontwards, and to $-\alpha$ when facing downwards ($\alpha$ is positive number).

Image space formation unit 115 carries out principal component analysis using a plurality of landmark data input through landmark data input unit 111 and a plurality of inclination amounts input through inclination amount input unit 113 with respect to face images input through image input unit 101. As a result of the principal component analysis, the obtained orthonormal coordinates are stored in storage unit 103 as the image space. Also, the image data input through image input unit 101, the landmark data and inclination amount corresponding to respective image data, and the parameter in the image space are stored in correspondence in storage unit 103.

The image processing apparatus of the present embodiment carries out the principal component analysis taking into consideration the inclination amount, differing from the principal component analysis carried out in an AAM. For the sake of simplifying the description, $X_1$ and $X_2$ are respective components of the vectors of the landmark point data aligned in the X and Y coordinates, $S_1$ is a landmark point of a face image oriented frontwards, $S_2$ is a landmark point of a face image oriented upwards, and $S_3$ is a landmark point of a face image oriented downwards.

FIG. 4 shows a distribution of respective landmark points of face images oriented frontward, upward, and downward along the $X_1$–$X_2$ coordinates. The circle located at the center represents the distribution of landmark points $S_1$ of a face image oriented frontwards. The overlapping circles at respective sides represent the distribution of landmark points $S_2$ of a face image oriented upwards and the distribution of landmark points $S_3$ of a face image oriented downwards. Here, the presence of correlation between components $X_1$ and $X_2$ is observed. However, it is not definite whether that correlation arises from inclination of the face or from difference in the shape. In other words, determination cannot be made whether this difference in distribution is caused by difference in a face image oriented frontwards, upwards or downwards, or difference in the face image itself oriented frontwards. By providing another Z axis, determination can be made between distribution of landmark points of a face image oriented frontwards and distribution of landmark points of a face image oriented upwards or downwards.

Figure 5:
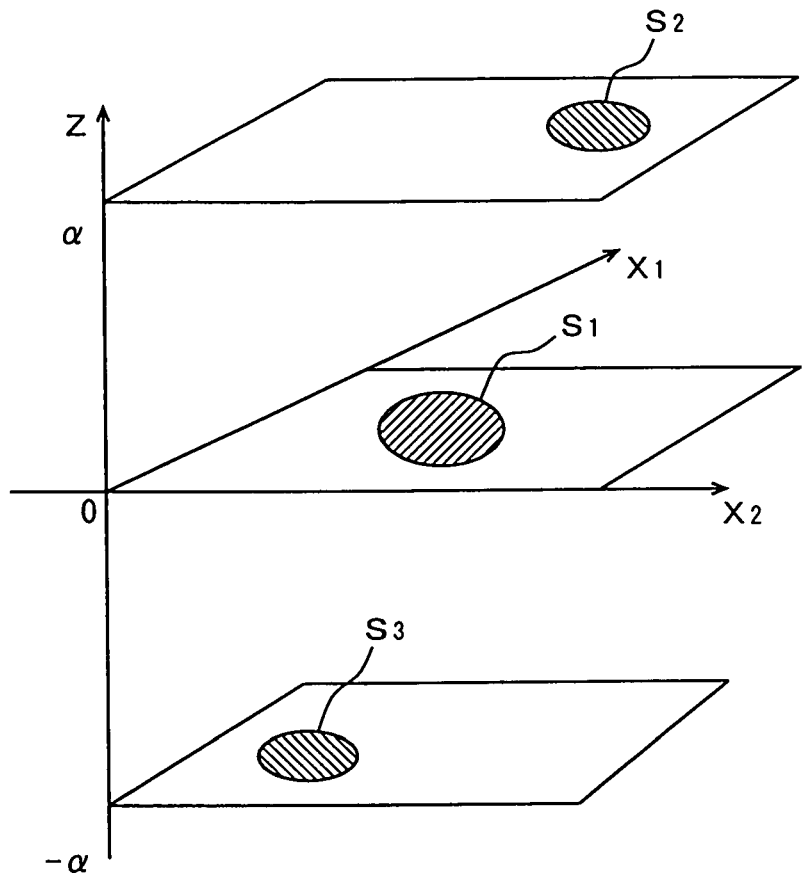
FIG. 5 represents distribution of respective landmark points with an Z axis provided perpendicular to the $X_1$–$X_2$ coordinates.

FIG. 5 represents distribution of landmark points with an Z axis newly provided perpendicular to the $X_1$–$X_2$ coordinates. Referring to FIG. 5, distinction is made among the distribution of landmark points $S_1$ of a face image oriented frontwards, distribution of landmark points $S_2$ of a face image oriented upwards, and distribution of landmark points $S_3$ of a face image oriented downwards. This indicates that the correlation between $X_1$ and $X_2$ is caused by difference in the orientation of frontwards, upwards or downwards. It is appreciated that respective distributions of landmark point $S_1$ of a face image oriented frontwards, landmark point $S_2$ of a face image oriented upwards and landmark point $S_3$ of a face image oriented downwards at respective $X_1$–$X_2$ coordinate planes are absent of correlation between $X_1$ and $X_2$.

Figure 6:
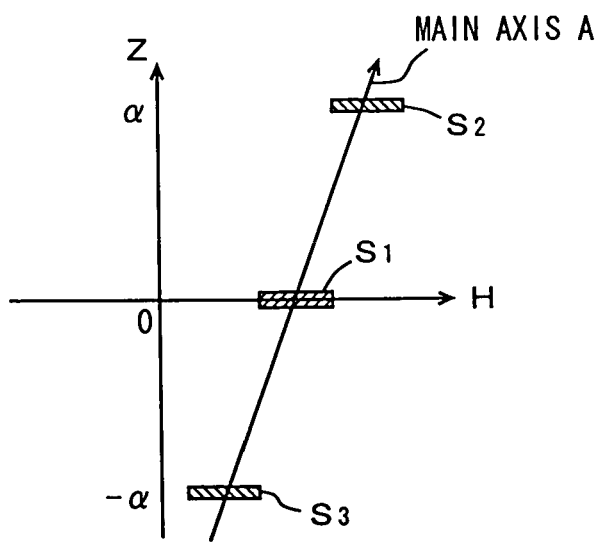
FIG. 6 shows a main axis A derived by the principal component analysis.

The result of applying principal component analysis on the landmark points of this three-dimensional space ($X_1$, $X_2$, Z) is shown in FIG. 6. Referring to FIG. 6, a main axis A indicating the inclination of the face image in the depth direction can be derived from the principal component analysis. Therefore, determination can be made that the correlation of the distribution of $X_1$ and $X_2$ has originated from face inclination. Thus, an axis (H) corresponding to change in a face oriented frontwards can be derived independent of the axis (A) corresponding to change in the face inclination. In FIG. 6, the H axis represents the plane of $X_1$–$X_2$.

By altering the component along the obtained main axis A, the face image can be altered corresponding to the inclination of the face in the depth direction. Also, by adjusting the component along the axis within the orthogonal complement with respect to partial space represented by main axis A, the face image can be deformed independent of the change by inclination in the depth direction. Therefore, an image can be synthesized effectively.

Figure 7:
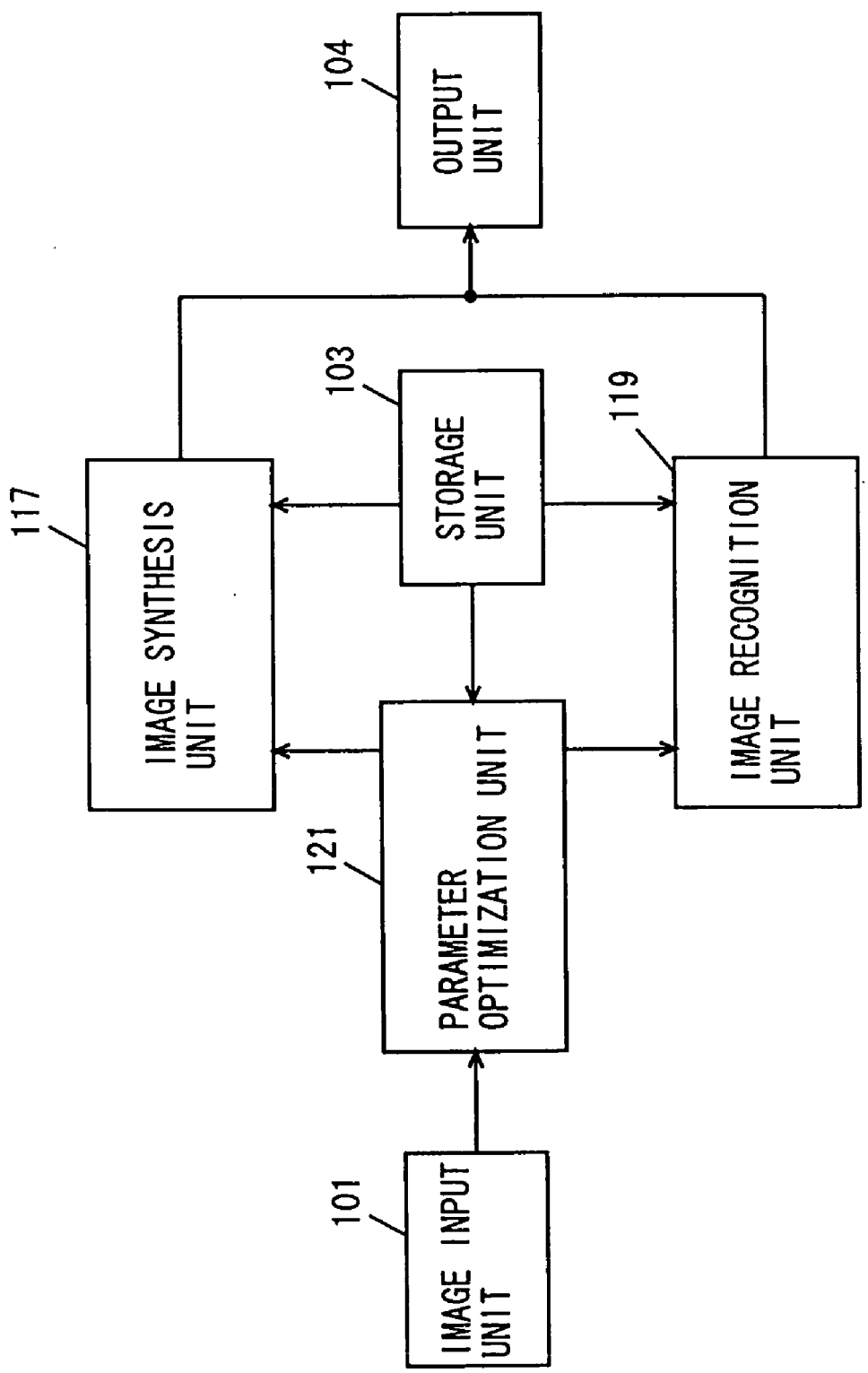
FIG. 7 is a block diagram schematically showing the image synthesis function and image recognition function of the image processing apparatus of the first embodiment.

The image synthesis function and image recognition function will be described hereinafter. FIG. 7 is a block diagram schematically showing functions of image synthesis and image recognition of the image processing apparatus of the present embodiment. Referring to FIG. 7, the image processing apparatus includes a parameter optimization unit 121 obtaining a landmark parameter in the image space of the input face image, an image synthesis unit 117 to synthesize an image at the image space based on the obtained landmark parameter, and an image recognition unit 119 to select a face image of an individual identical to the input face image out of a plurality of face images prestored in storage unit 103.

The face image input through image input unit 101 is provided to parameter optimization unit 121. The image space (basic vector) generated at image space formation unit 115, the face image used in generating the image space, and the landmark parameter of that image space are stored in storage unit 103.

The image synthesized at image synthesis unit 117 is provided from output unit 104. The result recognized at image recognition unit 119 is provided from output unit 104. "Recognized result" is a selected image or individual information such as the name corresponding to that image when an image is selected at image recognition unit 119, and information of "no relevance" when an image was not selected.

Parameter optimization unit 121 compares the face image input through image input unit 101 with the image synthesized using provisionally set landmark parameters at the image space stored in storage unit 103. The provisionally set landmark parameter is varied until the difference between the image synthesized at the image space and the input face image becomes smallest. The landmark parameter corresponding to the smallest difference is obtained. Accordingly, the landmark parameter for the face image input through image input unit 101 is obtained for each coordinate axis of the image space.

Image synthesis unit 117 alters the landmark parameter obtained at parameter optimization unit 121 to synthesize an image at the image space stored in storage unit 103. Accordingly, a face image oriented frontwards or oriented upwards/downwards can be synthesized and output even in the case where the face image input through image input unit 101 is inclined in the depth direction.

Image recognition unit 119 selects a face image whose distance between the vector with the landmark parameter obtained at parameter optimization unit 121 as the component and the vector with the landmark parameter of the face image stored in storage unit 103 as the component becomes smaller than a predetermined value out of the face images stored in storage unit 103. As this vector distance, the Mahalanobis distance taking into consideration data variance can be employed as well as the Euclidean distance.

The face image stored in storage unit 103 is the face image used in forming the image space at image space formation unit 119. The face image may also be a face image input after configuring the image space at image space formation unit 119.

Figure 8:
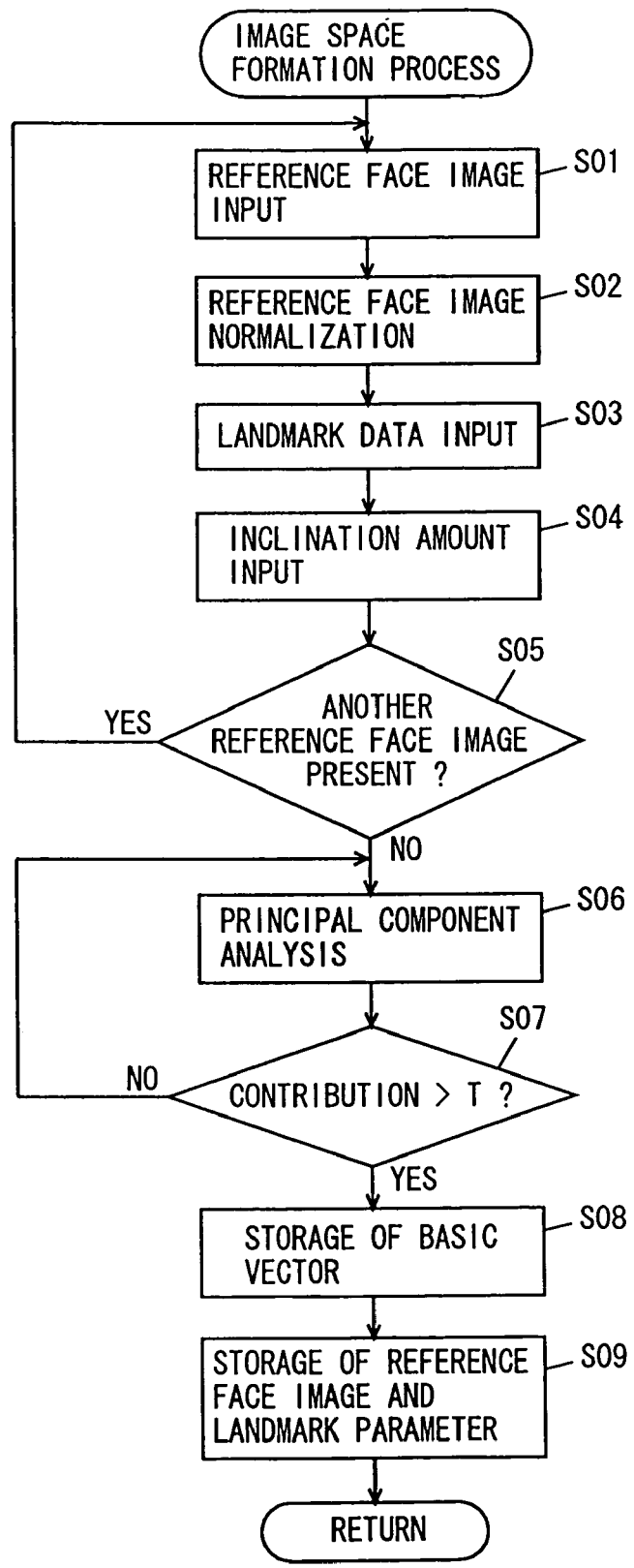
FIG. 8 is a flow chart of the image space formation process carried out by the image processing apparatus of the first embodiment.

The image space formation process carried out by the image processing apparatus of the present embodiment will be described with reference to the flow chart of FIG. 8. A face image of reference is input through image input unit 101 (S01). Here, a reference face image refers to the face image used in forming an image space at image space formation unit 115.

The reference face image input through image input unit 101 is normalized (S02). Normalization means that the size of the input reference face image is set to fit a predetermined reference. More specifically, the distance between the two eyes of a face image is set to conform to a predetermined value.

The coordinates of the landmark point and the grey-level value of the texture for the reference face image input through image input unit 101 are input by landmark data input unit 111 (S03). Then, the inclination amount of the input reference face image in the depth direction is input by input unit 113 (S04).

At step S05, determination is made whether there is another reference face image to be input. This determination is made by the signal input by the user through operation unit 102. In the case where there is another reference face image, the foregoing process of steps S01–S04 is carried out for the newly input reference face image. When there is no other reference face image to be input, control proceeds to step S06. By carrying out the process of steps S01–S04 on a plurality of reference face images, the landmark data and inclination amount are input for each of the plurality of reference face images.

At step S06, principal component analysis is carried out for all the landmark data and inclination amount of the reference face image input through image input unit 101. The principal component analysis is a well known statistical method, so that description thereof will not be provided here. Upon extracting the main component at step S06, control proceeds to step S07 to determine whether the total of the contribution rate is greater than threshold value T or not. The principal component analysis of step S06 is repeatedly carried out until the total of the contribution becomes larger than threshold value T.

When the contribution becomes larger than threshold value T, control proceeds to step S08 to store the basic vector representing the main component in storage unit 103. An image space is formed by the basic vector stored in storage unit 103.

At step S09, the landmark parameter in the image space obtained at step S08 is derived for the reference face image input through step S01. The obtained landmark parameter is stored in storage unit 103 in correspondence with the reference face image.

Thus, following formation of an image space, a database of a face image is generated including the reference face image used in producing the image space and the landmark parameters. The reference face image may be face images of completely different individuals, or face images of the same individual. In the case where the face images correspond to those of the same individual, the distribution of the landmark parameters representing the face image of the same individual in the image space is provided in a clustering range due to difference in the expression.

Figure 9:
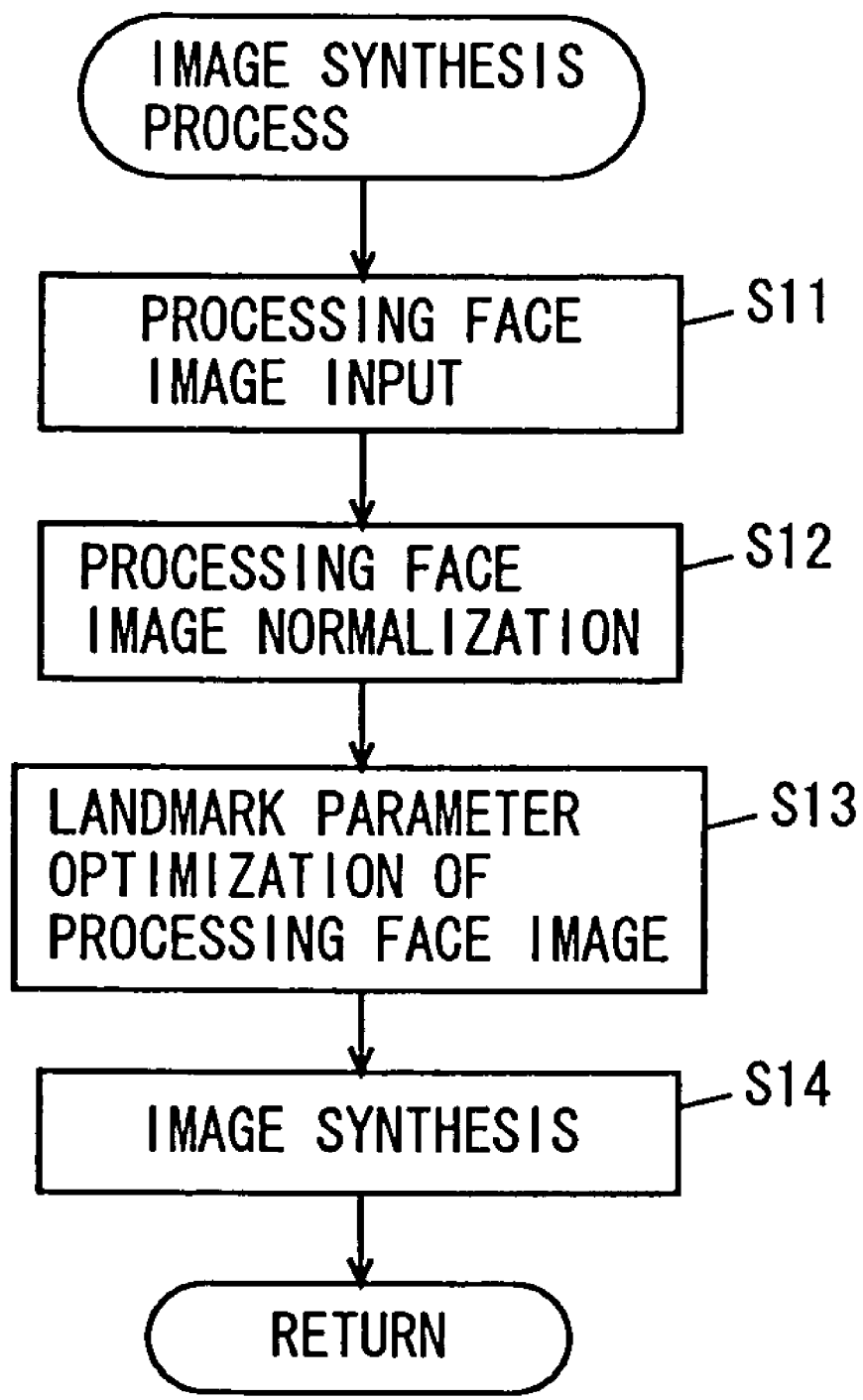
FIG. 9 is a flow chart of the image synthesis process carried out by the image processing apparatus of the first embodiment.

The image synthesis process carried out by the image processing apparatus of the present invention will be described with reference to the flow chart of FIG. 9. A processing face image is input through image input unit 101 (S11). Here, a processing face image refers to a face image that is to be subjected to image synthesis. Here, image synthesis is carried out by altering the face image of the individual represented in the processing face image to synthesize a face image of various expressions.

At step S12, the input processing face image is normalized. The foregoing description applies to normalization.

At step S13, the landmark parameter of the processing face image is optimized. Optimization of the landmark parameter is carried out by comparing the image synthesized at the image space using provisionally set landmark parameter with the processing face image and altering the landmark parameter in a direction where the difference between the images becomes the smaller. The optimized landmark parameter is the landmark parameter of the synthesized image corresponding to the smallest difference between the reference face image and the image synthesized at the image space. Accordingly, the landmark parameter of the processing face image input through step S11 in the image space is obtained. By altering the landmark parameter obtained at step S13, a face image of a different expression is synthesized in the image space (S14).

The image synthesis process carried out by the image processing apparatus of present embodiment is performed on the basis of the input processing face image. Alternatively, the landmark parameter can be directly input through manipulation unit 102 for each coordinate axis of the image space formed by the image space formation unit. In this case, the process of steps S11–S13 is dispensable.

Figure 10:
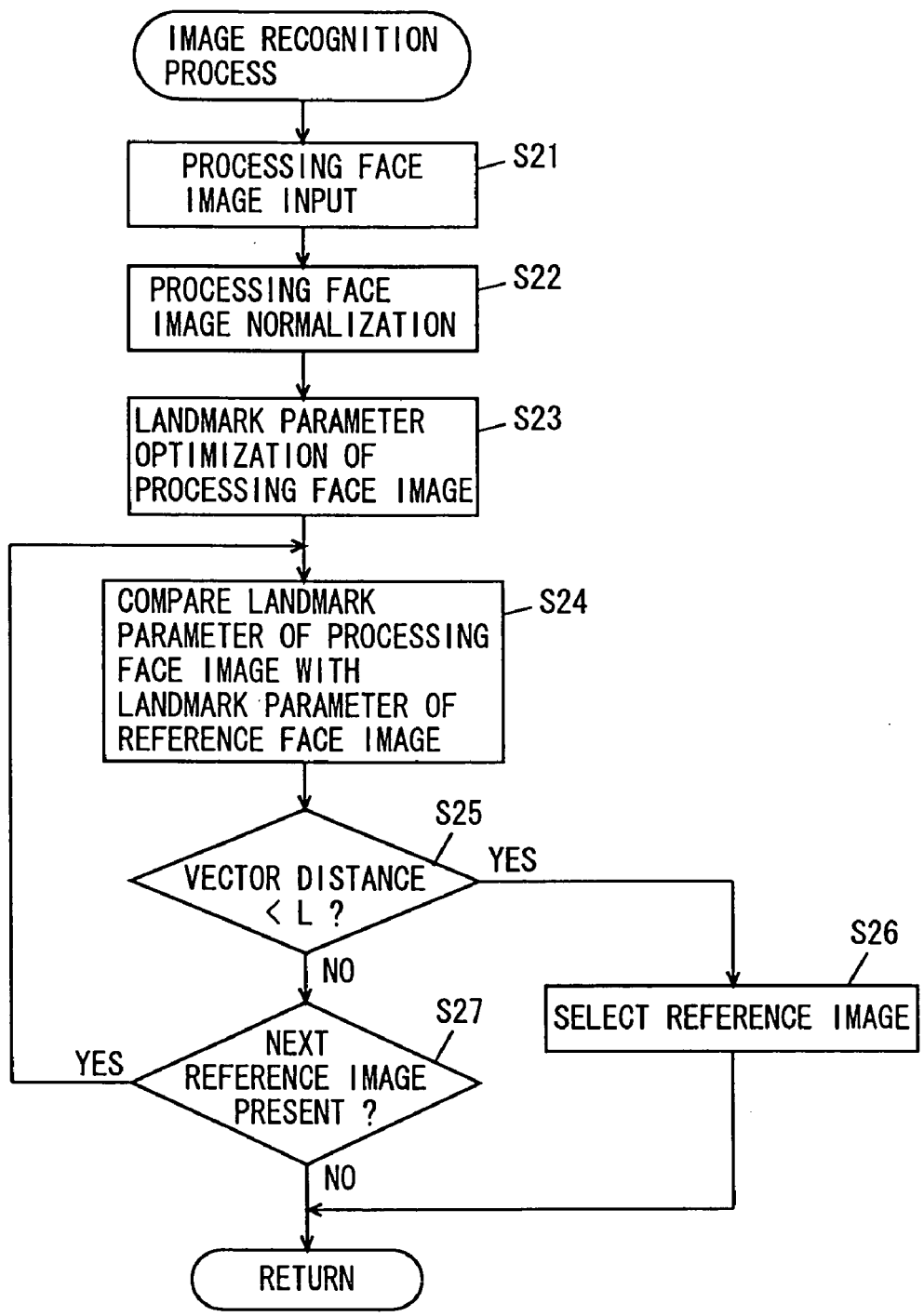
FIG. 10 is a flow chart of the image recognition process carried out by the image processing apparatus of the first embodiment.

The image recognition process carried out by the image processing apparatus of the present embodiment will be described with reference to the flow chart of FIG. 10. The process from steps S21–S23 is identical to the process from steps S11–S13 in the image synthesis process of FIG. 9. Therefore, description thereof will not be repeated. At step S23, upon obtaining the landmark parameter of the processing face image input through image input unit 101 in the image space at step S23, the vector with the landmark parameter of the processing face image as the component is compared with the vector with the landmark parameter of the reference face image stored in storage unit 103 as the component (S24). At step S25, determination is made whether the distance from respective vectors is smaller than a predetermined value L. When smaller than predetermined value L, control proceeds to step S26, otherwise to step S27.

It can be said that the processing face image resembles the reference face image more as the distance between the vectors becomes smaller. Therefore, determination can be made that the processing face image and the reference face image correspond to the same individual when the distance between the vector of the processing face image and the vector of the reference face image is smaller than threshold value L.

At step S26, the reference face image compared in step S25 is selected and provided to output unit 104. Then, the image recognition process ends.

At step S27, determination is made whether there is another reference face image to be subjected to comparison in storage unit 103. When there is a reference face image in storage unit 103, control proceeds to step S24. When there is no more reference face image, the image recognition process ends.

Here, the reference face image is the face image used in forming the image space of image space formation unit 115. The reference face image may be a face image input after the image space has been produced at image space formation unit 115.

According to the image processing apparatus of the present embodiment, principal component analysis is carried out with the inclination amount indicating inclination of the face image in the depth direction added to the landmark point data of the input face image to form an image space. Therefore, a face image can be synthesized corresponding to the inclination in the depth direction at the image space. Also, by adjusting the component along an axis in an orthogonal complement corresponding to the partial space represented by the main axis indicating inclination of the face image in the depth direction, the face can be deformed independent of the change due to inclination in the depth direction to synthesize an image. As a result, an image can be synthesized effectively.

Since the similarity with the face image stored in the storage unit is determined taking into account inclination of the input face image in the depth direction, distinction can be made between a variation mode of the same individual caused by difference in inclination of the depth direction and the variation mode due to difference in the shape of a different individual facing frontwards. The possibility of erroneous recognition due to difference in the inclination of the face in the depth direction can be reduced. As a result, the accuracy in recognition can be improved.

In the present embodiment, grey-level value is used as texture information. Color data can be also used.

In the present embodiment, landmark data corresponds to the coordinates of a landmark point and the grey-level value of the texture of the face image. However, image space formation, image synthesis and image recognition can be carried out using only the coordinates of the landmark point, or only the texture of a face image.

In the present embodiment, an image space is produced by carrying out principal component analysis with the inclination amount of an object in the depth direction as the image pickup condition in the present embodiment. The orientation of an object in the left or right direction (the direction of the face turning horizontally), or the occupying ratio of the object in the input image can be taken as the image pickup condition. In the case where the horizontal orientation of the object is taken as the image pickup condition, an image of an object oriented frontwards can be synthesized based on an image obtained by shooting an object from the side or obliquely from the side, not from the front. When the occupying ratio of the object in the image is to be taken as the image pickup condition, an image can be synthesized or recognized taking into consideration whether the actual face of the object is large or not. The image pickup condition can be used singularly or in combination.

Furthermore, the lighting condition or color temperature can be added as the image pickup condition. For example, in the case where an image space is formed with the brightness of the illumination taken as the image pickup condition, the image space can be formed taking into account the skin color of the object. More specifically, principal component analysis is carried out with the illumination of a bright or dark level as the image pickup condition to produce an image space. Accordingly, the object in the image obtained by shooting under the condition where illumination is not sufficient will be reduced in density. However, an image of an object with light skin color can be synthesized. Also, an image can be synthesized using an axis that has correlation with the skin color.

Furthermore, the input image can be subjected to Fourier transform or subjected to wavelet transform to become a wavelet factor so as to be employed as the image pickup condition.

Second Embodiment

An image processing apparatus according to a second embodiment of the present invention is directed to improvement of the parameter optimization unit of the image processing apparatus of the first embodiment. Components corresponding to those of the image processing apparatus of the first embodiment will not be repeatedly described.

Figure 11:
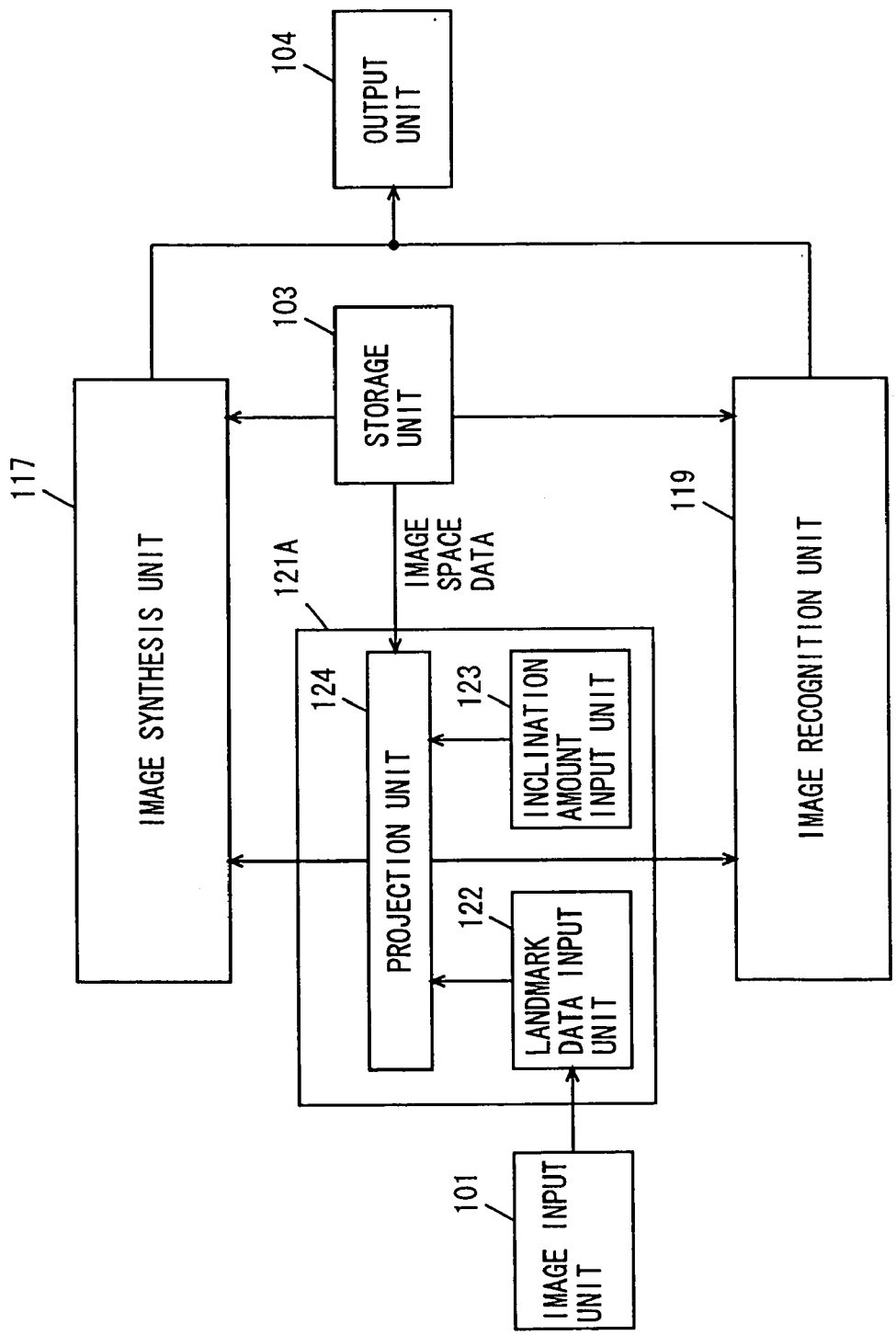
FIG. 11 is a block diagram schematically showing the image synthesis function and image recognition function of an image processing apparatus according to a second embodiment of the present invention.

FIG. 11 is a block diagram schematically showing the function of image synthesis and image recognition of the image processing apparatus of the second embodiment. Referring to FIG. 11, an image processing apparatus of the second embodiment includes a parameter optimization unit 121A obtaining a landmark parameter of the input face image at an image space, an image synthesis unit 117 to synthesize an image at the image space based on the obtained landmark parameter, and an image recognition unit 119 to select a face image identical to the input face image out of a plurality of face images prestored in storage unit 103.

Landmark data input unit 122 enters the coordinates of the landmark point of the face image input through image input unit 101 and the grey-level value of the texture of the face image as landmark data. Inclination amount input unit 123 enters an inclination amount of the face image input through image input unit 101 in the depth direction.

A projection unit 124 projects the landmark vector represented by the landmark data input through landmark data input unit 122 and the inclination amount input through inclination amount input unit 123 onto the coordinate axes of the image space stored in storage unit 103. A landmark parameter is obtained for each coordinate axis by the projection onto the coordinate axis of the image space. The obtained landmark parameter is provided to image synthesis unit 117 or image recognition unit 119.

Figure 12:
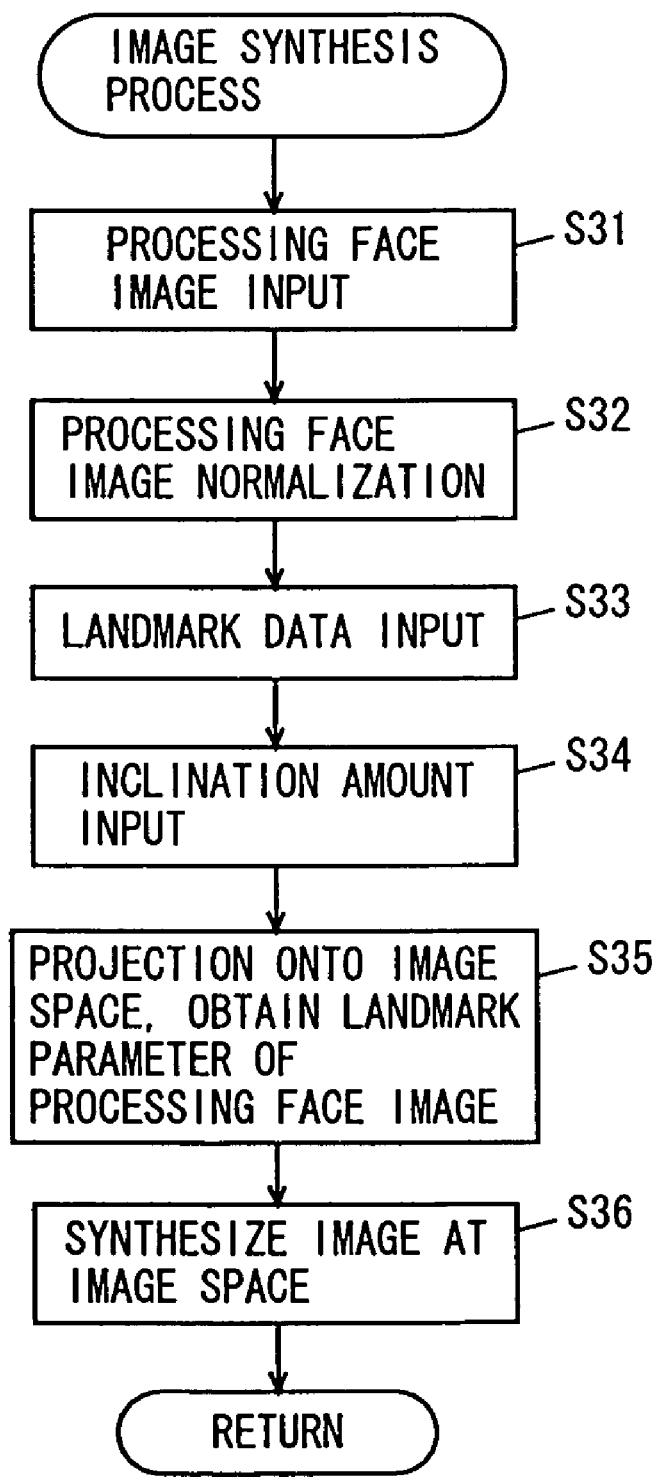
FIG. 12 is a flow chart of the image synthesis process carried out by the image processing apparatus of the second embodiment.

FIG. 12 is a flow chart of the image synthesis process carried out by the image processing apparatus of the second embodiment. A reference face image is input through image input unit 101 (S31). The input reference face image is normalized (S32).

Then, the coordinates and the grey-level value of the texture of the landmark point of the input reference face image are input (S33). The inclination amount of the reference face image in the depth direction is input (S34).

At step S35, the landmark vector represented by the input landmark data and inclination amount is projected at the image space stored in storage unit 103. As a result, the landmark parameter of the processing 1 face image input at step S31 in the image space is obtained. By altering the obtained landmark parameter, a face image of a different expression in the image space is synthesized (S36).

Figure 13:
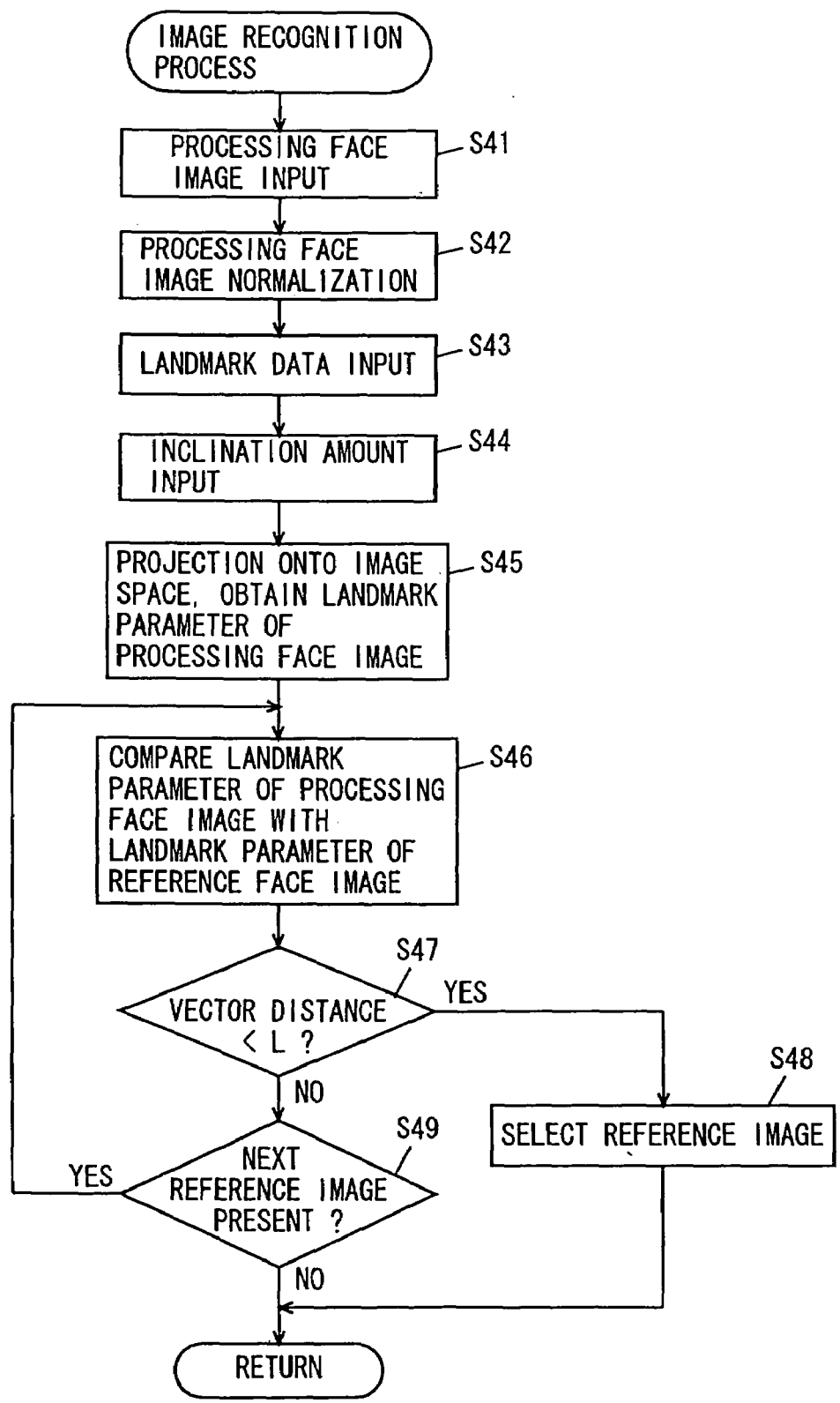
FIG. 13 is a flow chart of the image recognition process carried out by the image processing apparatus of the second embodiment.

FIG. 13 is a flow chart of the image recognition process carried out by the image processing apparatus of the second embodiment. The process of steps S41–S45 is identical to the process of steps S31–S35 of the image synthesis process of FIG. 12. Therefore, description thereof will not be repeated. At step S45, a landmark parameter of the processing image input through image input unit 101 in the image space is obtained. The vector with the landmark parameter of the processing face image as the component is compared with the vector with the landmark parameter of the reference face image stored in storage unit 103 as the component (S46). At step S47, determination is made whether the distance from respective vectors is smaller than a predetermined value L. When smaller than predetermined value L, control proceeds to step S48, otherwise to step S49. Determination is made that the processing face image and the reference face image correspond to the same individual when the distance between the vector of the processing face image and the vector of the reference face image is smaller than threshold value L.

At step S48, the reference face image compared at step S46 is selected and provided to output unit 104. Then, the image recognition process ends.

At step S49, determination is made whether another reference face image to be subjected to comparison is stored in storage unit 103 or not. When there is another reference face image stored in storage unit 103, control proceeds to step S46. In the case where there is no other reference face image, the image recognition process ends.

In the first and second embodiments, input of the inclination amount is carried out manually. Measurement means such as a laser sensor or ultrasonic sensor can be provided to enter the landmark point as three-dimensional data. In this case, it is not necessary to input the inclination amount since the landmark data corresponds to three-dimensional data. An advantage similar to that described in the foregoing can be obtained.

The process described of the image processing apparatus with reference to the flow charts of FIGS. 7, 8, 9, 11 and 12 is applicable to an image processing method or a recording medium recorded with an image processing program executing the same process.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
   a landmark amount input unit to input at least one landmark amount selected from a plurality of coordinate values to identify a shape of a face image or a plurality of grey-level values of texture of a face image, as the landmark amount of a face image included in an input image;
   an image pickup condition input unit to input inclination of a face image in a depth direction as an image pickup condition of capturing said input image; and
   an image space formation unit to form an image space by applying a statistical method on a plurality of said landmark amounts input through said landmark amount input unit and a plurality of image pickup conditions input through said image pickup condition input unit with respect to a plurality of face images.

2. The image processing apparatus according to claim 1, wherein said image pickup condition input through said image pickup condition input unit further includes brightness of illumination during image capturing.

3. An image processing method comprising the steps of:
   inputting at least one landmark amount selected from a plurality of coordinate values to identify a shape of a face image or a plurality of grey-level values of texture of a face image as the landmark amount of a face image included in an input image;
   inputting inclination of a face image in a depth direction as an image pickup condition of capturing said input image; and
   forming an image space by applying a statistical method on a plurality of said landmark amounts and a plurality of said image pickup conditions with respect to a plurality of face images.

4. A recording medium recorded with an image processing program for a computer to execute the steps of:

inputting at least one landmark amount selected from a plurality of coordinate values to identify a shape of a face image or a plurality of grey-level values of texture of a face image, as the landmark amount of a face image included in an input image;

inputting inclination of a face image in a depth direction as an image pickup condition of capturing said input image; and forming an image space by applying a statistical method on a plurality of said landmark amounts and a plurality of said image pickup conditions with respect to a plurality of face images.

5. The image processing method according to claim 3, wherein said image pickup condition further includes brightness of illumination during image capturing.

6. The recording medium recorded with an image processing program according to claim 4, wherein said image pickup condition further includes brightness of illumination during image capturing.

* * * * *